United States Patent [19]

Green et al.

[11] 3,925,217

[45] Dec. 9, 1975

[54] LUBRICANTS FOR ROLLING CONTACT BEARINGS

[75] Inventors: Richard L. Green, St. Louis; James C. Wygant, Creve Coeur, both of Mo.

[73] Assignee: Monsanto Company, St. Louis, Mo.

[22] Filed: July 10, 1974

[21] Appl. No.: 487,357

Related U.S. Application Data

[63] Continuation-in-part of Ser. No. 455,764, March 28, 1974, abandoned.

[52] U.S. Cl. ........... 252/52 A; 252/52 R; 252/56 R; 252/57; 252/59
[51] Int. Cl.². C10M 1/20; C10M 3/14; C10M 5/12; C10M 7/16
[58] Field of Search ........ 252/52 A, 52 R, 56 R, 57, 252/59

[56] References Cited
UNITED STATES PATENTS

| | | | |
|---|---|---|---|
| 3,267,037 | 8/1966 | Mitacek et al. | 252/59 |
| 3,658,708 | 4/1972 | Ratto | 252/52 R |
| 3,682,823 | 8/1972 | Smith et al. | 252/59 |
| 3,723,320 | 3/1973 | Herber et al. | 252/57 |
| 3,753,188 | 8/1973 | Miyoshi et al. | 208/19 |

*Primary Examiner*—Delbert E. Gantz
*Assistant Examiner*—I. Vaughn
*Attorney, Agent, or Firm*—William H. Duffey

[57] ABSTRACT

Elastohydrodynamic film thickness in rolling contact bearing lubrication and bearing fatigue life are improved by employing a fluid comprising one or more cyclohexyl compounds having two or more cyclohexyl rings, said rings being fused, concatenated or linked by one or more $C_1$ to $C_{16}$ alkylene, carboxy, or ether linkages, each of said compounds having from 10 to 70 carbon atoms.

7 Claims, No Drawings

LUBRICANTS FOR ROLLING CONTACT BEARINGS

This is a continuation-in-part of application Ser. No. 455,764 filed Mar. 28, 1974, and now abandoned.

BACKGROUND OF THE INVENTION

1. Field of the Invention

The present invention relates to improvements in the fatigue life and elastohydrodynamic (EHD) lubrication of antifriction bearings, e.g., roller and ball bearings. More specifically, the invention relates to the use of certain fluids which afford increased elastohydrodynamic film thickness, thus avoiding marginal lubrication and reliability while affording increased bearing fatigue life.

2. Description of Prior Art

In correctly made, properly installed and lubricated rolling contact bearings, the bearing life is generally determined by fatigue of the material of raceways and rolling elements in contact with each other. The time at which fatigue occurs is dependent upon the magnitude of stresses and the actual number of stress applications or stress cycles at the failure site.

Fatigue tests with many bearings conducted under carefully controlled conditions have provided the basis for load ratings advanced by various bearing manufacturers. These ratings are always based upon a certain life expectancy percentage. A widely used rating expression is the "$B_{10}$ life" of a rolling contact (antifriction) bearing. The $B_{10}$ life is expressed in units of time, usually hours, and signifies that 90 percent of a given quantity of bearings of that type will exceed the quoted life at the specified conditions of speed, lubricant, temperature and load or stress.

It is well known that the lubricant itself can have a significant impact on the fatigue life of a rolling contact bearing. Modern lubricants for high performance ball and roller bearings often employ highly refined mineral oil base stocks with multipurpose additive packages incorporated therein. Certain synthetic fluid base stocks, usually esters, are also known as bearing lubricants. A need remains, however, for a new class of lubricants which will extend bearing fatigue life beyond that afforded by the most modern formulated mineral oils or synthetic lubricants.

If the rolling elements of a ball or roller bearing are actually separated by an elastohydrodynamic lubricant film, the bearing may be expected to have a very long operating life. In practice, however, it has been found that many EHD films are hydrodynamically starved and are therefore thinner than might be expected from EHD theory. Hydrodynamic starvation can result in metal-to-metal contact between opposing surface asperities on the bearing raceways and rolling elements. In many cases the thin EHD films can detract from normal bearing life. In other cases, however, such films can be tolerated even though the surface asperities are actually exposed. This is because some lubricants employ additives which react with the metal to form metal-organic protective films. The lubricant oxidative stability, however, is usually reduced by such additives. Furthermore, certain antiwear additives useful in lubricants may initially reduce bearing wear but usage over extended periods can cause corrosive wear of rolling contact bearing metals.

Insufficient EHD film thickness has been encountered, for example, in ball bearing such as the type employed in inertial gyros. Operation of the gyro spin axis bearings at low speeds has resulted in the bearing starvation with a resulting decrease in fatigue life. Such bearings are characterized by high rotational speeds, e.g., over 20,000 rpm. The detrimental starvation, however, often occurs at very low rotational speeds where the EHD film has not adequately developed.

In certain specialized bearing applications a premium is placed upon extended fatigue life at the expense, if necessary, of a higher frictional drag torque caused by the lubricant per se. Thus, even though a particular lubricant may cause slightly higher rotational drag losses due to churning, fluid shear, dynamic friction, etc., it can nonetheless be a desirable lubricant if the bearing life is prolonged due to other properties. High speed gyro bearings are typical of such a specialized application. Another example is found in bearings employed in spin stabilized communication satellites. It has been found, however, that even the most modern formulated mineral oils or synthetic lubricants can exhibit marginal EHD film thickness in specialized applications.

It is an object of the present invention, therefore, to provide a means and method for increasing the EHD film thickness and fatigue life of rolling contact bearings by way of lubricant selection. Another object of the present invention is to provide synthetic fluids which afford increased bearing fatigue life in comparison to typical mineral oil lubricants. Still another object of the present invention is to provide a defined class of synthetic fluids which affords increased bearing fatigue life in comparison to commonly used synthetic lubricants. Yet another object is to provide stable synthetic lubricants with viscosities similar to mineral oils but with improved bearing fatigue properties.

Another object of the present invention is to provide synthetic fluids which afford greater EHD film thickness at low operating speeds thus preventing starvation and minimizing raceway wear. Still another object of the present invention is to provide synthetic fluids which afford greater EHD thickness on startup for a given quantity of lubricant in the bearing cavity. Yet another object of the present invention is to provide synthetic fluids which exhibit unique EHD film thickness retention at zero bearing velocity during rotational direction changes. Still another object is to provide stable synthetic lubricants with viscosities similar to mineral oils containing antiwear additives but with thicker EHD film-forming properties. These and other objects of this invention will be apparent from the following description.

SUMMARY

It has been discovered that a defined class of synthetic fluids provide superior lubricants for antifriction bearings because of unexpectedly improved EHD film thickness characteristics and fatigue life characteristics. These synthetic fluids exhibit fatigue life properties and EHD film thicknesses superior to those of conventional mineral oil and synthetic fluid base stocks.

The superior lubricants of the present invention comprise compounds having from 10 to about 70 carbon atoms and including at least two cyclohexyl groups.

DESCRIPTION OF PREFERRED EMBODIMENTS

The compounds of the present invention which are generally useful as superior base stocks for lubricants for antifriction bearings comprise one or more cyclohexyl compounds having two or more cyclohexyl rings which are fused, concatenated or linked by one or more $C_{1-16}$ alkylene, carboxy, or ether linkages, each of which compounds has a total of from 10 to about 70 carbon atoms. Preferred compounds are those having from two to about six cyclohexyl rings and more preferably from two to four such rings.

Especially preferred compounds for use in the present invention are hydrogenated dimers and/or trimers of alphaalkyl styrene. In general, it is preferable that the hydrogenated material contain less than about 20% by weight of the cyclic compound, and more preferably 10% or less. Although the alkyl group of the alpha-alkyl styrene can be from one to four carbon atoms, it is generally preferred that this alkyl group be ethyl or methyl.

The preferred dimers and trimers are accordingly hydrogenated linear or cyclic dimers or trimers of alpha-methylstyrene and alpha-ethylstyrene, hydrogenated linear co-dimers of alpha-methylstyrene and alpha-ethylstyrene and mixtures thereof.

Examples of representative concatenated and linked cyclohexyl compounds other than the aforementioned alpha-alkyl styrene dimers and trimers include dicyclohexyl, 4-(1-methylethyl)dicyclohexyl, 4,4'-bis(1-methylethyl)dicyclohexyl, x-isohexyl-4'-isopropyldicyclohexyl, x-cyclopentyldicyclohexyl, dicyclohexylmethane, (x-ethylcyclohexyl)cyclohexylmethane, [x-cyclohexyl(1-methylethyl)]cyclohexylmethane, bis(2,4,6-trimethylcyclohexyl)methane, 1,1-dicyclohexylethane, 1,1,3-tricyclohexylpropane, 1,2,3-tricyclohexylpropane, trimethylolpropane tricyclohexanecarboxylate, 1,2-tercyclohexyl, 1,3-tercyclohexyl, x-(1,1-dimethylbutyl)-1,3-tercyclohexyl, x-(1,1-dimethylbutyl)1,2-tercyclohexyl, 1,2-isopropyltercyclohexyl, 1,3-isopropyltercyclohexyl, bis(1,3-cyclohexyloxy)cyclohexane, 1,x-bis(methylcyclohexyl)cyclohexane, dicyclohexyl cyclohexane-1,3-dicarboxylate, x,X'-quatercyclohexyl, tricyclohexylmethane, bis, cis- and trans-1,3-cyclohexyl cyclohexanedicarboxylate, 1,1-dicyclohexyl-2-methylpropane, 1,1-dicyclohexyl-2-methylbutane, 1,1-dicyclohexyl-2,5-dimethylhexane, 1,1-dicyclohexylpentane, 1,2-dicyclohexylpropane, 1,2-di(x-ethylcyclohexyl)-propane, 2,2-dicyclohexylpropane, 2,3-dicyclohexyl-2,3-dimethylbutane, 1,3-dicyclohexyl-2-methylbutane and 1,3-dicyclohexylbutane. A particularly preferred class of such compounds are those selected from the group consisting of dicyclohexyl, alkyl dicyclohexyl, tercyclohexyl, alkyl tercyclohexyl, quatercyclohexyl, quinquicyclohexyl, 2,3-dicyclohexyl-2,3-dimethylbutane, and mixtures thereof, wherein the alkyl contains from 1 to about 18 carbon atoms.

Examples of fused ring cyclohexyl compounds and compounds having structures including combinations of fused, concatenated, and/or linked cyclohexyl groups include cisdecalin, trans-decalin, 2,3-dimethyldecalin, isopropyldecalin, t-butyldecalin, perhydrofluorene, perhydrophenanthrene, perhydromethylcyclopentadiene trimer, perhydrocyclopentadiene trimer, perhydrofluoranthene, 1-cyclohexyl-1,3,3-trimethylhydrindane, x-hexylperhydrofluoranthene, x-cyclohexylperhydrofluoranthene, poly(ethyl-1-methyl)perhydrofluoranthene, x-isopropylperhydrofluoranthene, x-cyclohexylperhydrofluorene, x-isododecylperhydrofluorene, 1-cyclohexyldecalin, 2-(cyclohexyl-x-methyl)bicyclo(2,2,1)heptane, perhydropyrene, ethylperhydrofluorene, perhydroanthracene, bis-2-decalin, 1-cyclohexyldecalin, 2-cyclohexyldecalin, dimethyl cyclohexyldecalin, 4,5-methyleneperhydrophenanthrene, 1,3-dicyclohexyloxycyclohexane, and cyclohexyl decahdronaphthyl ether. A particularly preferred class of such compounds are those selected from the group consisting of decalin, cyclohexyldecalin, alkyl substituted decalin, alkyl substituted cyclohexyldecalin, and mixtures thereof, wherein the alkyl contains from 1 to about 18 carbon atoms.

In addition to the cyclohexyl type base stocks recited above, the base stocks employed in the present invention may contain minor amounts of other lubricating compositions including, for example, paraffinic and naphthenic petroleum oils, $C_{2-5}$ polyolefins and synthetic lubricants such as mono- and dicarboxylic acid esters. The utility and operability of the instant invention is in no way negated by the inclusion of minor amounts of such noncritical base stock constituents in combination with the cyclohexyl compound which is the essential component. In this regard, hydrogenated polyisobutylene has been found to be a superior blending constituent.

PREPARATION OF UNSATURATED DIMERS

Linear dimers of alpha-alkyl styrene can be prepared by polymerizing monomers of alpha-alkyl styrenes according to known techniques. Particularly preferred monomers include alpha-methylstyrene and alpha-ethylstyrene, and the ring substituted monomers such as methyl-alpha-methylstyrene, methylalpha-ethylstyrene, ethyl-alpha-methylstyrene, ethyl-alpha-ethylstyrene, isopropyl-alpha-methylstyrene, isopropyl-alpha-ethylstyrene, and the like.

Alpha-alkyl styrenes are readily polymerized to corresponding unsaturated dimers by contacting monomers of alpha-alkyl styrene with a minor proportion, e.g., 5% by weight or less, of a catalyst material such as a mixture of phosphorus oxyhalide and a small amount of a strong mineral acid.

The catalyst material can be a mixture of phosphorus oxychloride or phosphorus oxybromide and a strong mineral acid such as hydrochloric acid, hydrobromic acid, ortho-phosphoric acid, nitric acid, or sulfuric acid, or an aqueous solution of any of these acids in amounts corresponding to from 80 to 98 percent by weight of the phosphorus oxyhalide and from 20 to 2 percent by weight of the acid. Other catalysts including acidic clays such as activated montmorillonite and Lewis acid catalysts are also useful in the polymerization of alpha-alkyl styrenes.

The polymerization can be carried out by mixing a small amount of the catalyst material with the monomers and thereafter maintaining or heating the mixture at a reaction temperature between 0° and 130°C., preferably from 10° to 80°C. and at atmospheric pressure, although higher pressures may be used.

The unsaturated linear dimers formed consist of a mixture of the corresponding isomeric 1-pentene and 2-pentene derivatives. For instance, the unsaturated dimers of alpha-methylstyrene are the isomeric compounds 2,4-diphenyl-4-methyl-1-pentene and 2,4-diphenyl-4-methyl-2-pentene respectively. The relative proportions in which the 1-pentene and 2-pentene isomeric derivatives are formed appears to be dependent for the most part upon the temperature at which the polymerization reaction is carried out. At temperatures of from about 0° to 80°C., the polymerization reaction tends toward the formation of the unsaturated compound 2,4-diphenyl-4-methyl-1-pentene as the major component while at higher temperatures of from about 90° to 130°C., 2,4-diphenyl-4-methyl-2-pentene is usually formed in amounts equal to or greater than the 1-pentene isomer. The particular isomer formed is of little importance to the present invention, however, since both isomers yield the same hydrogenated product.

The dimerization reaction is preferably conducted at temperatures of less than about 130°C. to encourage the formation of linear dimers in preference to cyclic dimers. Dimerization of alpha-methylstyrene at 100°C. in the presence of 0.50% montmorillonite catalyst provides about 80 mole percent conversion to unsaturated dimers consisting of about 97 weight percent linear dimer and 3 percent cyclic dimer. These unsaturated dimerized products are recovered from the unreacted monomers by distillation. It is to be understood, of course, that the scope of the present invention is not intended to exclude those dimers and trimers of alpha-methylstyrene wherein the cyclic moiety is preponderant in comparison to the linear moiety. Certain applications may make such fluids desirable.

HYDROGENATION OF UNSATURATED DIMERS

Unsaturated dimers of alpha-alkyl styrene can be hydrogenated using conventional techniques. The hydrogenation is preferably carried out in the presence of molecular hydrogenation catalysts capable of promoting the hydrogenation such as, for example, metals, especially those of Group VI through Group VIII of the Periodic Table, or their compounds, particularly their oxides either alone or in various mixtures with each other, or on carrier materials such as silica, zinc, oxide, alumina, charcoal, kieselguhr, etc.

The reaction can take place at temperatures from about 20°C. to 250°C. and at pressures of from about atmospheric to 2500 psig. The preferred operating conditions are generally from about 50°C. to 200°C. and from about 500 to 1500 psig. The hydrogenation of the unsaturated dimers is substantially complete so that less than about 2 percent, and preferably less than 0.5 percent unsaturation remains in the hydrogenated product.

The hydrogenation can be conducted in the presence of a suitable organic solvent, most often one which is inert to the hydrogenation conditions such as, for instance, paraffins, naphthenes and sterically hindered unsaturated hydrocarbons.

The aforementioned preparation and hydrogenation of the alpha-alkyl styrene dimers is applicable and may automatically result in, the formation of alpha-alkyl styrene trimers, the latter being particularly useful in certain bearing applications where specific viscosity requirements must be met or where high EHD film thickness is required for low speed bearing operation. In such cases, a blend of dimer and trimer is useful.

In addition to the cyclohexyl-type base stock material, the lubricants of this invention may contain conventional additive materials including, for example, viscosity index improvers, antioxidants, antiwear agents, corrosion inhibitors, dispersants, dyes, antifoam agents and the like.

Several methods and techniques have been devised for laboratory determination of rolling contact bearing fatigue life. One widely used apparatus is the "RC" (Rolling Contact) fatigue tester described in U.S. Pat. No. 3,053,073 issued Sept. 11, 1962. The RC fatigue tester, a laboratory type device, has demonstrated good correlation with full scale bearing fatigue data. This is seen in CRC Report No. 413, "The Development of Equipment and Techniques for Evaluating Effects of Oils on Bearing Fatigue Life," June 1969, Coordinated Research Council, Inc., 30 Rockefeller Plaza, New York, N.Y.

As stated in Column 4 of U.S. Pat. No. 3,053,073 the use of Weibull distribution plots affords accurate predictions of bearing fatigue life from RC rig data.

The following Examples 1 through 3 illustrate the remarkably superior bearing fatigue life which can be achieved with synthetic fluids of the present invention when compared to prior art bearing lubricants. In Examples 1 and 2, the fatigue test apparatus was similar to that of U.S. Pat. No. 3,053,073. Bearing life is expressed as "$B_{10}$" and "$B_{50}$" in units of stress cycles. Stress cycles are readily converted to operating hours by considering the rated bearing speed. "$B_{10}$" life has been previously defined. "$B_{50}$" signifies that 50 percent of a given quantity of bearings of the type tested will exceed the quoted life at the specified operating conditions.

EXAMPLE 1

Two lubricants were compared for relative performance on the fatigue life tester. One was a control or reference fluid and the other was a synthetic fluid within the scope of this invention. The control fluid was an ester base stock commonly used in turbine engine lubricants conforming to Military Specification MIL-L-23699. The rolling contact fatigue life associated with the control fluid was known to be comparable to that of most qualified and commercially available MIL-L-23699 fluids. More specifically, the control fluid was a pentaerythritol ester of a short chain aliphatic acid.

In contrast, the synthetic fluid of this invention consisted essentially of completely hydrogenated linear dimers and trimers of alpha-methylstyrene. More specifically, the synthetic test fluid contained 75.5 percent by weight hydrogenated linear dimer of alpha-methylstyrene, 23.5 percent by weight hydrogenated linear trimer of alpha-methylstyrene, and 1.0 percent by weight 2,6-di-t-butyl-p-cresol.

Both the control fluid and the hydrogenated alpha-methylstyrene fluid were evaluated with the same test specimen. The test specimen is shaped as a cylindrical rod and is identified by reference numeral 20 in U.S. Pat. No. 3,053,073. The Hertz stress was 700,000 pounds per square inch (492.2 × 10$^6$ kilograms per square meter); the test specimen speed was 12,500 rpm.; the fluid temperature was 200°F. (93.3°C.) and the test specimen temperature was 600°F. (315°C.).

Table I below presents the remarkably higher fatigue life numbers obtained with the fluid of this invention (hydrogenated alpha-methylstyrene) in comparison to that of the control fluid. Five tests were run on the former fluid and eight on the latter, the data of Table I representing averaged results.

TABLE I

| Fluid | Fatigue Life (Stress cycles × 10$^6$) | |
|---|---|---|
| | $B_{10}$ | $B_{50}$ |
| Control fluid | 1.47 | 2.53 |
| Hydrogenated alpha-methylstyrene formulation | 8.91 | 15.96 |

In the following example, several additional fluids were compared for relative performance on the fatigue life tester.

EXAMPLE 2

An ester-based synthetic fluid conforming to Military Specification MIL-L-7808 was used as the control fluid. Two synthetic fluids within the scope of the present invention were employed for comparison.

The test specimen temperature was 300°F. (149°C.); the Hertz stress was 700,000 pounds per square inch (492.2 × 10⁶ kilograms per square meter); the test specimen speed was 12,500 rpm.; the test specimen material was SAE 52100 steel, a standard bearing alloy steel; and the fluid temperature was approximately 100°F. (37.8°C.).

Table II below presents the significantly higher fatigue life data obtained with fluids of this invention in comparison to that of the control fluid. All percentages are by weight.

TABLE II

| Fluid | Fatigue Life (Stress cycles × 10⁶) | |
|---|---|---|
| | $B_{10}$ | $B_{50}$ |
| a) Control fluid | 1.3 | 2.7 |
| b) Tercyclohexyl | 2.2 | 4.2 |
| c) 99.0% hydrogenated linear dimer of alpha-alkyl styrene; and 1.0% 2,6-di-t-butyl-p-cresol | 4.2 | 7.0 |

To further illustrate the superior bearing fatigue life which can be achieved through use of synthetic fluids of the present invention, a fatigue test was conducted according to the following Example 3 with an actual roller bearing instead of the fatigue test apparatus hereinbefore described.

EXAMPLE 3

A paraffinic mineral oil having a nominal viscosity of 115 to 120 Saybolt Universal Seconds at 100°F. (37.8°C.) was used as the control fluid. This fluid was representative of modern mineral oils useful for lubricating rolling contact bearings.

For comparison, a synthetic fluid within the scope of this invention was employed. The synthetic test fluid contained 94.0 percent by weight hydrogenated linear dimer of alpha-methylstyrene, 5.0 percent by weight hydrogenated linear trimer of alpha-methylstyrene, and 1.0 percent by weight 2,6-di-t-butyl-p-cresol.

The fatigue test was conducted on a tapered roller bearing having a mean cone diameter of 2.4 inches. The bearing was operated at a cone speed of 2700 revolutions per minute under a maximum Hertz stress of 272,000 pounds per square inch (191 × 10⁶ kilograms per square meter).

Fluid flow to the test bearing was maintained at a rate of 0.25 gallons per minute (0.95 liters per minute) while the bearing temperature (measured on the outside diameter) was controlled at 150°F. (65.6°C.) for the first run and at 240°F. (115.6°C.) for the second run.

Table III below presents the fatigue results of Example 3 wherein the fluid of this invention imparted 1.7 times more fatigue resistance to the bearing at 150°F. and 3.5 times more resistance at 250°F., than that of the mineral-based control fluid.

TABLE III

| Fluid | Fatigue Life (Stress cycles × 10⁶) | | | |
|---|---|---|---|---|
| | $B_{10}$ at 150°F. | $B_{50}$ at 150°F. | $B_{10}$ at 240°F. | $B_{50}$ at 240°F. |
| Control Fluid | 28.7 | 100.5 | 7.5 | 25.2 |
| Hydrogenated alpha-methylstyrene formulation | 49.2 | 158.3 | 26.1 | 84.9 |

When a mixture of hydrogenated linear dimers and trimers of alpha-methylstyrene is employed herein, the relative proportions can vary within very broad limits. From the foregoing examples, however, it is seen that superior fatigue results can be achieved with a preponderance of dimer present. Thus, a preferred dimer-trimer mixture contains from about 60 percent to about 95 percent hydrogenated linear dimer of alpha-methylstyrene and from about 5 percent to about 40 percent hydrogenated linear trimer of alpha-methylstyrene.

Several methods and techniques have been devised for measuring the EHD thickness in antifriction bearings under dynamic conditions. One of these is known as the contact resistance technique. The following Examples 4 and 5 set forth the details of a laboratory experiment wherein the contact resistance technique was used to illustrate the surprising and unexpected increase in EHD film thickness experienced with a fluid of the present invention in comparison to a typical mineral oil lubricant of the prior art.

EXAMPLE 4

The test bearing, designed for relatively low rotational speeds, was an angular contact ball bearing having a 2.36 inch (6.0 cm) bore diameter on the inner race and a 3.74 (9.5 cm) inch outside diameter on the outer race. The ball retainer was intentionally removed and there were 19 balls, each having a 0.406 inch (1.03 cm) diameter.

The test bearing was mounted on an electric motor with the rotational axis vertical and the inner race was driven at speeds from 0 to 100 revolutions per minute (rpm). The outer race was restrained from rotation. A 35 pound (15.9 kilogram) weight on the outer race provided a 35 pound axial bearing preload. An electrical circuit was provided across the bearing with a liquid metal slip ring which allowed 100 microamps with a 10 millivolt open circuit voltage across the bearing. The voltage drop across the bearing was read on a recorder together with the rpm.

The test bearing was cleaned using xylene, acetone and a fluorocarbon after which a thick film of the test oil was liberally applied to the bearing surfaces. The bearing was then operated between 0 and 100 rpm under a 35 pound axial load and the voltage drop across the bearing was measured at increments of 10 rpm from 0 to 100 rpm. Prior to testing, a decade resistance box was substituted in place of the bearing to calibrate the recorder. The inherent frequency response of the recorder permitted average bearing resistance to be read.

Two test runs were made, one with a typical formulated mineral oil of the prior art having a 100°F. (37.8°C.) viscosity of 114 centistokes and one with a fluid within the scope of the present invention having a 100°F. viscosity of 120 centistokes. The latter fluid consisted essentially of completely hydrogenated linear dimers and trimers of alpha-methylstyrene. More specifically, the synthetic fluid contained 57.4% by weight hydrogenated linear dimer of alpha-methylstyrene and 35.18% by weight hydrogenated linear trimer of alpha-methylstyrene. Also included was 4.63% of an acrylate viscosity index improver, 1.85% by weight of a zinc phosphorodithioate wear inhibitor, and other typical additives each in less than 1% by weight, such as a defoamer, etc.

Thus, the two fluids being compared each possessed the same approximate viscosity and each was formulated with a typical additive package.

The results of Example 4 are presented in Table IV below:

TABLE IV

| Bearing RPM | Average Bearing Resistance (Ohms) | |
|---|---|---|
| | Hydrogenated Alpha-Methylstyrene Fluid | Mineral Oil |
| 10 | 70 | 0 |
| 20 | 700 | 0 |
| 30 | ∞ | 6 |
| 40 | ∞ | 15 |
| 50 | ∞ | 55 |
| 60 | ∞ | 100 |
| 70 | ∞ | 200 |
| 80 | ∞ | 400 |
| 90 | ∞ | 700 |
| 100 | ∞ | 1100 |

Table IV illustrates the diverse performance characteristics of the fluids with respect to EHD lubrication wherein full EHD lubrication is signified in Table IV by the symbol "∞" (infinity). Thus, when the measured resistance across the bearing (in ohms) is an infinite quantity, full EHD lubrication is achieved. When the resistance is a finite quantity such as 1100 ohms, the lubricant film is still in the mixed region, i.e., still somewhere between partial EHD film with high metal to metal contact and full EHD thickness with no asperity contact.

At 100 rpm on the test bearing the mineral oil was still in the mixed region while the alpha-methylstyrene based fluid achieved full EHD lubrication at 40 rpm. The superiority of the fluids of the present invention for low speed operation of bearings is very apparent from the results of Table IV.

To further illustrate the superior EHD lubrication imparted by the fluids of the present invention, another comparative test was conducted, this time on a smaller bearing but one designed for much higher operating speeds than the bearing of Example 4. Details and results of the second test are set forth in Example 5.

EXAMPLE 5

Two new Model R-2 instrument ball bearings with twelve 1/16 inch diameter balls were assembled without the customary ball retainer. It has been found that the desired free oil quantity in the ball raceway tracks can most readily be controlled in a retainerless bearing. Further, retainerless bearings are much easier to control to stable torque levels than conventional bearings with retainers. Each bearing of this Example 5 was operated with a full ball complement with 96 micrograms of a synthetic fluid within the scope of this invention. The synthetic fluid comprised an 80%:20% by weight mixture of hydrogenated linear trimers and hydrogenated linear dimers of alpha-methylstyrene. The fluid had a viscosity of 160 centistokes at 137°F. (58.3°C.); 1,418 centistokes at 100°F. (37.8°C.); and 18.4 centistokes at 210°F. (98.9°C.)

Two test bearings were mounted in a housing and supported the ends of a shaft holding a gyro motor rotor. A 1.5 pound axial preload was applied and the operating temperature was controlled at 137°F. with a desired maximum speed of 2,400 rpm. Film thickness was measured with a mechanical system adapted to sense film thickness changes in terms of the bearing axial displacements. This mechanical displacement, in turn, cooperated with an electrical measuring instrument having sensitivity capable of measuring film thickness to less than one microinch.

Several starts were made from 0 rpm and the bearings in each case were accelerated rapidly to the rated speed of 2,400 rpm and the fluid film thickness was recorded during the starts. The first start produced a surprising 32 microinch fluid film which dropped off within five minutes to 11.7 microinches due to the bearing reaching an equilibrium with the lubricant retained in the bearing. A restart resulted in an initial 25 microinch film reducing to 21 microinches. Such high film thicknesses are extremely unusual at most speeds. By comparison with experience on the same type bearing with highly refined mineral lubricating oils of the prior art, with 160 centistokes viscosity at 137°F., the latter had half the initial film thickness of the synthetic fluid within the scope of this invention. The substantial film thicknesses experienced with the synthetic fluid of this invention occurred at bearing speeds some 100 to 1,000 times less than for prior art fluids. Thus, the surprising ability of the fluids of the present invention to form substantial EHD films at very low bearing speeds provides a lubrication advancement unknown to the prior art.

Thus, the alpha-methylstyrene trimer/dimer mixture employed in this Example 5 afforded EHD film generation at extremely low rpm, viz., more than 5 microinches at 15 rpm and 137°F. fluid temperature. A repeat run at 110°F. (43.3°C.) resulted in a 10 microinch film thickness at 7 rpm. These unusually high initial films were observed on each start following a period of rest regardless of whether the direction of rotation of the bearing had been reversed. If the bearing was allowed to remain stopped for several seconds after rotation reversal, the abnormally high initial film was not observed. Nonetheless, the low speed film thickness with the synthetic fluid of this invention was remarkably higher than that observed with mineral base lubricants.

Bearing torques were higher at all speeds with the alpha-methylstyrene fluid than with the mineral oil control fluid. On a low speed dynamometer at room temperature, torques were about double at 1 rpm and three to four times greater at 20 rpm. At 2,400 rpm and 137°F., the torque was approximately four times greater for alpha-methylstyrene trimer/dimer than for the typical highly refined mineral oil control fluid. Since the frictional losses in antifrictional bearings are many orders of magnitude lower than other losses in mechanical power transmission systems, such increased torques can usually be tolerated in exchange for substantially higher EHD film thicknesses particularly at the troublesome low speed operating conditons.

While the present invention has been described with respect to specific examples and embodiments, it is to be understood that the invention is not limited thereto and that it can be variously practiced within the scope of the following claims.

The embodiments of this invention in which an exclusive property or privilege is claimed are defined as follows:

1. A method for improving the elastohydrodynamic film thickness and increasing the fatigue life of rolling contact bearings which comprises introducing to the rolling contact surfaces a fluid comprising one or more cyclohexyl compounds having two or more cyclohexyl rings, said rings being fused, concatenated or linked by one or more $C_1$ to $C_{16}$ alkylene, carboxy, or ether linkages, each of said compounds having from 10 to 70 carbon atoms.

2. A method of claim 1 wherein the fluid comprises a compound having from 2 to 6 cyclohexyl rings.

3. A method of claim 2 wherein the fluid comprises a hydrogenated dimer or trimer of alpha-alkyl styrene or mixtures thereof.

4. A method of claim 3 wherein the alpha-alkyl styrene is alpha-methylstyrene.

5. A method of claim 4 wherein the cyclic dimer of alpha-methylstyrene is present in no more than 20 percent by weight.

6. A method of claim 4 wherein the hydrogenated dimer consists essentially of from about 90 percent to 100 percent by weight hydrogenated linear dimer of alpha-methylstyrene and from 0 percent to 10 percent by weight hydrogenated cyclic dimer of alpha-methylstyrene.

7. A method of claim 3 wherein the fluid mixture contains from about 60 percent to about 95 percent by weight hydrogenated linear dimer of alpha-methylstyrene and from about 5 percent to about 40 percent by weight hydrogenated linear trimer of alpha-methylstyrene.

* * * * *